Oct. 22, 1935.    G. M. GILLEN ET AL    2,018,061
BOTTLE CLOSURE
Filed Dec. 8, 1933
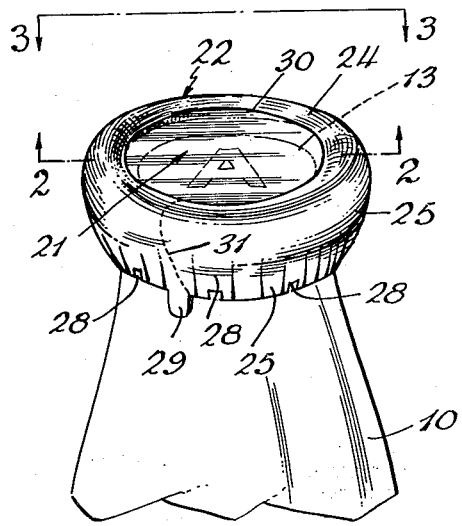
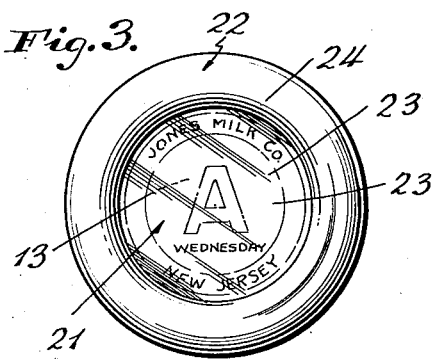
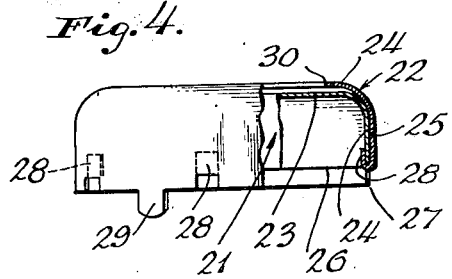
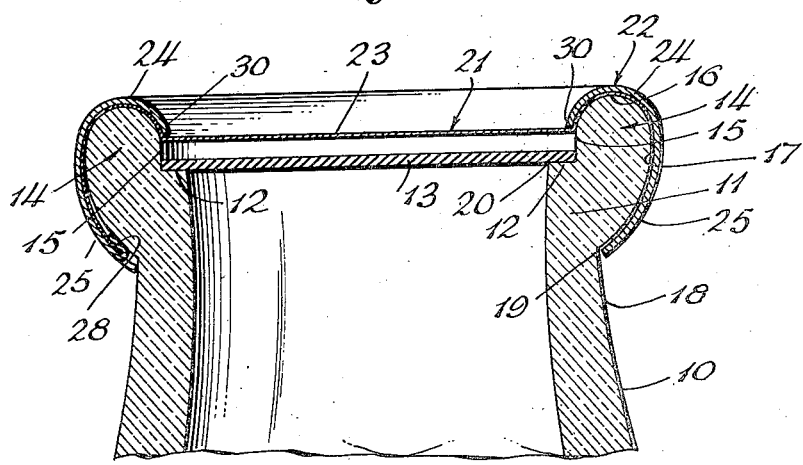
INVENTORS
GEORGE M. GILLEN
WILLIAM HERVEN PACKER
BY Richards & Geier
ATTORNEYS.

Patented Oct. 22, 1935

2,018,061

UNITED STATES PATENT OFFICE 2,018,061

BOTTLE CLOSURE

George M. Gillen, Paterson, and William Herven Packer, Wyckoff, N. J.

Application December 8, 1933, Serial No. 701,420

2 Claims. (Cl. 215—38)

The present invention relates to bottle closures and it particularly relates to a milk bottle cap or cover construction for sanitary purposes.

For sanitary and health purposes it is desirable to enclose and cover the tops of milk bottles, and particularly the pouring lips thereof, to prevent contamination thereof during distribution and storage.

As a general rule, however, the closures which have been employed to cover the pouring lip of a milk bottle, in addition to or in combination with the paper disc usually inserted inside of the pouring lip have not been satisfactory because of the difficulty of removing them and because of the fact they would often break during transit, distribution and storage, leaving the pouring lip unprotected and aiding rather than preventing the collection of impurities and dirt around the pouring lip.

An object of the present invention is to provide a bottle closure for protecting the pouring lip of the usual type of milk bottles which will be inexpensive and which will be readily applied to the milk bottle and which at the same time will give substantial assurance that the milk will be protected throughout transit, distribution and storage against contamination and against the collection of dirt, dust and impurities, and which will withstand considerable handling without damage or breakage.

Other objects will be obvious and will appear during the course of the following specification.

It has been found most satisfactory in accomplishing the above objects to place a cap of a transparent cellulosic material, as for example the material sold under the trade-mark "Cellophane" over the top of the milk bottle, under substantial tension or stress, and to enclose the periphery of such cellulosic cap as well as the entire pouring lip with a relatively flexible sheet of this metal material, which may be readily torn away from the bottle and which at the same time will hold the cellulosic cover under substantial tension.

The above and other objects will appear more clearly from the following detailed description, when taken in connection with the accompanying drawing, which illustrates one embodiment of the inventive idea.

In the drawing:

Fig. 1 is a perspective view of the upper portion of a milk bottle in perspective, showing the application of the invention of the present application thereon.

Fig. 2 is a side sectional view upon the line 2—2 of Fig. 1 upon an enlarged scale, and Fig. 3 is a top view of the closure combination of Fig. 1 taken in the direction of the arrows 3 of Fig. 1.

Fig. 4 is a fragmentary side sectional view of the closure before application to the milk bottle top.

Referring to Figs. 1 and 2 the milk bottle 10 converges to a mouth 11 provided with the interior shoulder 12 receiving the paper disc stopper 13 and also provided with the pouring lip 14.

The mouth 11 with the shoulder 12 and the lip 14 are preferably formed that there will be a vertical portion 15 extending upwardly from the shoulder 12 and so that the upper portion pouring lip 16 will be approximately circular, the surface being described from a center point at about the top of the vertical portion 15. The outside descending portion of the lip 17 becomes a curve of constantly increasing diameter until it meets the outside wall 18 of the milk bottle at the point 19. The shoulder 12 preferably extends into the lip 14 a distance equivalent to between one-fifth to one-third the thickness of the lip 14.

By constructing the pouring lip in this manner it will most effectively receive the combined transparent cellulosic closure 21 and metal ring 22.

The combined transparent cap 21 and the metallic annular closure 22 are shown assembled with the milk bottle in Figs. 1, 2 and 3 and before assembly therewith apart from the milk bottle in Fig. 4.

Referring to Figs. 3 and 4, it will be noted that the transparent cap is provided with a flat portion 23 and a vertical skirt 24.

This transparent cap 21 is placed within the metal ring 22 which is similarly provided with a horizontal annular portion 24 and a depending vertical cylindrical portion or skirt 25.

Preferably, the transparent cap 21 is placed in the annular metal cup 22 so that the flat portion 23 of the cap will be substantially spaced from the flat portion 24 of the thin metal annular cup 22.

It will be noted in Fig. 4 that the lower edge of the transparent cup terminates at 26 substantially above the terminating edge 27 of the metallic annular cup 22. Portions of the lower edge of the skirt 25 are upturned as indicated at 28 to grip the lower edge 26 of said transparent cup 21. Extending from the lower edge 27 of the foil cup 22 may be provided the tongue 29 by which the metal cup 22 may be torn and removed from the bottle.

The combination as shown in Fig. 4 may be positioned directly upon the top of the milk bottle, shown in Figs. 1, 2 and 3, and then by running a tool around the pouring lip the inner edge 30 of the flat portion 24 will be depressed inwardly and downwardly, as indicated in Figs. 1 and 2, stretching the flat porion 23 of the transparent cellulosic cup 21 and forcing it below the top of the pouring lip or bead 16.

At the same time the skirt 25 will be collapsed and forced inwardly to clamp the curved portion 17 of the lip 14, as shown in Figs. 1 and 2.

In removing the milk bottle top, the cup 22 may be readily severed along the line 31 as indicated in Fig. 1 by pulling the tongue 31 upwardly. The entire combination 21—22 may then be readily removed.

It will be noted that in placing the cap in position upon the milk bottle, as shown in Figs. 1 and 2, the edges 30 are turned sufficiently downwardly and the flat portion 21 is sufficiently depressed and stressed that it will assume a position approximating the top of the vertical wall portion 15.

The transparent cellulosic cup 21 may be between 1/100 to 1/1000 of an inch in thickness and it may also be made of diverse colors if desired. The horizontal portion 23 of the cup 21 may also be printed if desired.

The annular metal cup 22 may be made of very thin foil or sheet flexible tin, aluminum or other metals, varying between 1/100 to 1/1000 of an inch in thickness.

What is claimed is:

1. In combination with a milk bottle of the type having a relatively heavy glass wall, an interior shoulder adjacent the top thereof receiving a thick horizontally positioned paper disk closure, an upwardly extending vertical wall around said shoulder, and a pouring lip including a circular top portion, and an external downwardly extending curved portion of decreasing curvature; a pouring lip closure for covering said pouring lip and preventing contamination thereof, said closure including a thin transparent inverted cellulosic cup with a horizontal portion extending over the top of the bottle and a skirt portion extending downwardly along the upper side of the bottle and an inverted annular thin sheet metal cup outside of and clamping said transparent cup to said pouring lip, said metal cup being provided with a horizontal rim portion extending over said circular top portion and a skirt extending over said external downwardly extending curved portion, said metal cup leaving the central portion of the cellulosic cup uncovered whereby the paper closure may be observed therethrough, said metal cup being collapsed to conform to the shape of said pouring lip, to hold said cellulosic cup in tension and to depress the horizontal portion of said cellulosic cup substantially down within the mouth of the bottle and below the upper portion of said pouring lip, said closure including means to hold said cellulosic cup in predetermined assembled position inside of said metal cup.

2. The closure of claim 1 in which said last mentioned means takes the form of inturned tongues on said metal cup and said metal cup is made of aluminum foil.

GEORGE M. GILLEN.
WILLIAM HERVEN PACKER.